United States Patent
Ahn et al.

(10) Patent No.: US 11,845,842 B2
(45) Date of Patent: *Dec. 19, 2023

(54) WINDOW COVER FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Jong Nam Ahn, Daejeon (KR); Hye Jin Kim, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 487 days.

This patent is subject to a terminal disclaimer.

(21) Appl. No.: 17/034,448

(22) Filed: Sep. 28, 2020

(65) Prior Publication Data

US 2021/0100120 A1  Apr. 1, 2021

(30) Foreign Application Priority Data

Sep. 30, 2019  (KR) ........................ 10-2019-0120530

(51) Int. Cl.
| | |
|---|---|
| C08K 5/09 | (2006.01) |
| C09D 5/24 | (2006.01) |
| C08J 5/18 | (2006.01) |
| B32B 7/12 | (2006.01) |
| B32B 27/08 | (2006.01) |
| C08J 7/046 | (2020.01) |
| D06N 7/00 | (2006.01) |
| B32B 27/28 | (2006.01) |
| C08J 7/044 | (2020.01) |
| C08J 7/04 | (2020.01) |
| H05K 5/00 | (2006.01) |

(52) U.S. Cl.
CPC ................ *C08J 7/046* (2020.01); *B32B 7/12* (2013.01); *B32B 27/281* (2013.01); *C08J 7/042* (2013.01); *C08J 7/044* (2020.01); *C08J 7/0427* (2020.01); *D06N 7/0042* (2013.01); *B32B 2255/26* (2013.01); *B32B 2307/21* (2013.01); *B32B 2307/412* (2013.01); *B32B 2307/728* (2013.01); *B32B 2457/20* (2013.01); *C08J 2379/08* (2013.01); *C08J 2483/06* (2013.01); *H05K 5/0017* (2013.01)

(58) Field of Classification Search
None
See application file for complete search history.

(56) References Cited

U.S. PATENT DOCUMENTS

| | | |
|---|---|---|
| 6,103,368 A | 8/2000 | Fukuda et al. |
| 7,604,381 B2 | 10/2009 | Hebrink et al. |
| 9,061,474 B2 | 6/2015 | Ju et al. |
| 9,132,611 B2 | 9/2015 | Takeuchi |
| 9,580,555 B2 | 2/2017 | Ju et al. |
| 9,676,960 B2 | 6/2017 | Kim et al. |
| 9,706,649 B2 | 7/2017 | Jung et al. |
| 9,791,597 B2 | 10/2017 | Jee et al. |
| 9,914,811 B2 | 3/2018 | Song et al. |
| 10,118,371 B2 | 11/2018 | Kim et al. |
| 10,280,336 B2 | 5/2019 | Shin et al. |
| 10,591,761 B2 | 3/2020 | Jee et al. |
| 10,738,173 B2 | 8/2020 | Chae et al. |
| 10,759,966 B1 | 9/2020 | Kim et al. |
| 10,815,378 B2 | 10/2020 | Kim et al. |
| 10,882,958 B2 | 1/2021 | Ryu et al. |
| 11,518,921 B2 * | 12/2022 | Ahn ........................ C03C 17/42 |
| 2010/0028682 A1 | 2/2010 | Shinohara |
| 2011/0171445 A1 | 7/2011 | Jung et al. |
| 2012/0021234 A1 | 1/2012 | Fukukawa et al. |
| 2013/0011651 A1 | 1/2013 | Iizumi et al. |
| 2013/0203937 A1 | 8/2013 | Cho et al. |
| 2013/0207294 A1 | 8/2013 | Jeon et al. |
| 2015/0344625 A1 | 12/2015 | Kino et al. |
| 2016/0024348 A1 | 1/2016 | Kim et al. |

(Continued)

FOREIGN PATENT DOCUMENTS

| | | |
|---|---|---|
| CN | 109765729 A | 5/2019 |
| JP | H08309940 A | 11/1996 |

(Continued)

OTHER PUBLICATIONS

Lee et al. "Measurement of Flexural Modulus of Lamination Layers on Flexible Substrates", Journal of the Microelectronic Packaging Society, 2016, pp. 63-67, vol. 23, No. 3 English-Language Abstract.

(Continued)

*Primary Examiner* — Sheeba Ahmed
(74) *Attorney, Agent, or Firm* — THE WEBB LAW FIRM

(57) ABSTRACT

The present invention relates to a new window cover film protecting a flexible display panel. Specifically, provided is a window cover film protecting a surface of a display device, the window cover film including a protective film formed on a base layer or a hard coating layer of a hard coating film having the base layer and the hard coating layer, and having no problem that the window cover film cannot be used as a display window cover film because a part of the protective film is not peeled off due to static electricity generated in the protective film, the base layer, or the hard coating layer when the protective film is peeled off, and the protective film remains on the base layer or a hard coating layer or the hard coating layer is partially or entirely peeled off.

15 Claims, 4 Drawing Sheets

(56) References Cited

U.S. PATENT DOCUMENTS

| | | |
|---|---|---|
| 2016/0046830 A1 | 2/2016 | Kim et al. |
| 2016/0185926 A1 | 6/2016 | Song et al. |
| 2017/0106636 A1 | 4/2017 | Jo et al. |
| 2017/0117523 A1 | 4/2017 | Kim et al. |
| 2017/0276840 A1 | 9/2017 | Horio et al. |
| 2017/0313901 A1 | 11/2017 | Lee |
| 2017/0342224 A1 | 11/2017 | Chae et al. |
| 2018/0113350 A1 | 4/2018 | Jee et al. |
| 2018/0142127 A1 | 5/2018 | Park et al. |
| 2018/0297330 A1 | 10/2018 | Jeon et al. |
| 2019/0033494 A1 | 1/2019 | Kim et al. |
| 2019/0077960 A1 | 3/2019 | Kim et al. |
| 2019/0134963 A1 | 5/2019 | Hara et al. |
| 2019/0153161 A1 | 5/2019 | Ryu et al. |
| 2019/0256658 A1 | 8/2019 | Odle et al. |
| 2019/0375894 A1 | 12/2019 | Sakayori et al. |
| 2019/0390057 A1 | 12/2019 | Miyamoto et al. |
| 2020/0010736 A1 | 1/2020 | Lee et al. |
| 2020/0108587 A1 | 4/2020 | Han et al. |
| 2020/0142102 A1 | 5/2020 | Kikuchi |
| 2020/0339769 A1 | 10/2020 | Lee et al. |
| 2021/0070017 A1 | 3/2021 | Wilson et al. |
| 2021/0100120 A1 | 4/2021 | Ahn et al. |

FOREIGN PATENT DOCUMENTS

| | | |
|---|---|---|
| JP | 2004138655 A | 5/2004 |
| JP | 2011508039 A | 3/2011 |
| JP | 2012210780 A | 11/2012 |
| JP | 2014501301 A | 1/2014 |
| JP | 201632881 A | 3/2016 |
| JP | 201733031 A | 2/2017 |
| JP | 201733033 A | 2/2017 |
| JP | 2017503887 A | 2/2017 |
| JP | 2017520662 A | 7/2017 |
| JP | 201853156 A | 4/2018 |
| JP | 2018109773 A | 7/2018 |
| JP | 2018119133 A | 8/2018 |
| KR | 1019920002156 B1 | 3/1992 |
| KR | 100813179 B1 | 3/2008 |
| KR | 1020090064421 A | 6/2009 |
| KR | 1020100016372 A | 2/2010 |
| KR | 1020120067645 A | 6/2012 |
| KR | 1020120078510 A | 7/2012 |
| KR | 1020120079127 A | 7/2012 |
| KR | 101248671 B1 | 3/2013 |
| KR | 1020130025391 A | 3/2013 |
| KR | 20130074167 A | 7/2013 |
| KR | 1020130078764 A | 7/2013 |
| KR | 101380033 B1 | 4/2014 |
| KR | 101401733 B1 | 5/2014 |
| KR | 20150113916 A | 10/2015 |
| KR | 1020150138758 A | 12/2015 |
| KR | 20160013402 A | 2/2016 |
| KR | 20160020615 A | 2/2016 |
| KR | 1020160055655 A | 5/2016 |
| KR | 1020160057221 A | 5/2016 |
| KR | 20160062353 A | 6/2016 |
| KR | 1020160103681 A | 9/2016 |
| KR | 1020160117396 A | 10/2016 |
| KR | 1020170016297 A | 2/2017 |
| KR | 1020170043885 A | 4/2017 |
| KR | 1020170132499 A | 12/2017 |
| KR | 1020170136285 A | 12/2017 |
| KR | 20180018307 A | 2/2018 |
| KR | 1020180018306 A | 2/2018 |
| KR | 101839293 B1 | 3/2018 |
| KR | 20180044216 A | 5/2018 |
| KR | 20180068252 A | 6/2018 |
| KR | 1020180058912 A | 6/2018 |
| KR | 1020180071943 A | 6/2018 |
| KR | 1020180101463 A | 9/2018 |
| KR | 101922169 B1 | 11/2018 |
| KR | 20190010119 A | 1/2019 |
| KR | 1020190018114 A | 2/2019 |
| KR | 20190029110 A | 3/2019 |
| KR | 20190029790 A | 3/2019 |
| KR | 1020190026611 A | 3/2019 |
| KR | 1020190037116 A | 4/2019 |
| KR | 1020190039180 A | 4/2019 |
| KR | 1020190063306 A | 6/2019 |
| KR | 20190078225 A | 7/2019 |
| KR | 1020190080297 A | 7/2019 |
| KR | 20190090300 A | 8/2019 |
| KR | 1020190094841 A | 8/2019 |
| KR | 1020190098679 A | 8/2019 |
| WO | 2016114389 A1 | 7/2016 |
| WO | 2017188174 A1 | 11/2017 |
| WO | 2018143554 A1 | 8/2018 |
| WO | 2018207914 A1 | 11/2018 |

OTHER PUBLICATIONS

Kim et al. "Transparent Urethane Siloxane Hybrid Material for Flexible Cover Window with Ceramic-like Strength, yet Polymer-like Modulus", ACS Applied Materials & Interfaces, 2018, 30 pages.

"Measurement method of physical properties—Measurement method of flexural property", R&F Chemical, retrieved from http://mfchemicaL.com/md/reference-2/?pageid=18&uid+769&mod=document.

"Terephthaloyl chloride | C8H4Cl2O2—PubChem", https://pubchem.ncbi.nlm.nih.gov/compound/Terephthaloyl-chloride.

* cited by examiner

WINDOW COVER FILM AND FLEXIBLE DISPLAY PANEL INCLUDING THE SAME

CROSS-REFERENCE TO RELATED APPLICATION

This application claims priority to Korean Patent Application No. 10-2019-0120530 filed Sep. 30, 2019, the disclosure of which is hereby incorporated by reference in its entirety.

TECHNICAL FIELD

The following disclosure relates to a window cover film protecting a surface of a display device and a flexible display panel including the same.

BACKGROUND

A thin type display device such as a liquid crystal display device or an organic light emitting diode display device is implemented in a touch screen panel type, and has been widely used in various smart devices having portability such as a smart phone, a tablet PC, and various wearable devices.

Such a portable touch screen panel-based display device is provided with a display protective window cover on a display panel for protecting the display panel from scratches or external impact. Recently, as a material of a window cover film, glass has been replaced with plastic.

As a base material for the window cover film, polyethylene terephthalate (PET), polyethersulfone (PES), polyethylene naphthalate (PEN), polyacrylate (PAR), polycarbonate (PC), polyimide (PI), polyaramid (PA), polyamide-imide (PAI), or the like which is flexible and transparent has been used.

In addition, after a protective film is attached onto such a base material to prevent attachment of foreign matters or the like, the window cover film is stored and moved.

The protective film is required to not be peeled off and slid by an external force during movement and storage of the window cover film, and thus, the protective film has a predetermined adhesive force. In addition, the protective film is required to be easily peeled off from the window cover film when applied as a window cover.

However, when the protective film is peeled off from the window cover film, adhesive strength of the protective film is increased due to static electricity, and thus, an adhesive component of the protective film remains on a surface of the window cover film in some cases.

In addition, in a case where the window cover film is attached to a display panel with an optically clear adhesive layer such as an optically clear adhesive (OCA) layer or an optically clear resin (OCR) layer interposed between the window cover film and the display panel, the optically clear adhesive layer is peeled off in some cases.

In addition, even in a case where the hard coating layer is formed on the window cover film to reinforce surface properties, optical properties, and mechanical properties of the window cover film, when the protective film attached to the hard coating layer is peeled off, the hard coating layer is peeled off from the window cover film due to static electricity.

RELATED ART DOCUMENT

Patent Document (Patent Document 1) Korean Patent Laid-Open Publication No. 10-2013-0074167 (Jul. 4, 2013)

SUMMARY

An embodiment of the present invention is directed to providing a window cover film in which an adhesive component of a protective film is prevented from remaining on the window cover film and a hard coating layer or an optically clear adhesive layer formed on one surface of the window cover film is prevented from being peeled off, when the protective film is peeled off.

Another embodiment of the present invention is directed to providing a window cover film in which an optically clear adhesive layer such as an OCA layer or an OCR layer is not delaminated.

Still another embodiment of the present invention is directed to providing a flexible display panel including a window cover film in which peelability of a protective film is improved.

In one general aspect, a window cover film includes: a polyimide-based base layer; and an antistatic layer formed on one surface of the base layer and having a surface resistance of $1 \times 10^6 \Omega/\square$ or more and a water contact angle of 80° or less.

The antistatic layer may have a surface resistance of $1 \times 10^7$ to $1 \times 10^{13} \Omega/\square$ and a water contact angle of 20 to 70°.

The antistatic layer may have a thickness of 1 nm to 1 μm.

The antistatic layer may include a siloxane-based resin which is a hydrolysis condensation reaction product of an alkoxysilane-based compound.

The antistatic layer may further include an organic acid or an organic acid salt.

In the window cover film including the polyimide-based base layer and the antistatic layer, a light transmittance measured at 388 nm may be 3% or more, a total light transmittance measured at 400 to 700 nm may be 86% or more, a haze may be 1.5% or less, a yellow index may be 4.0 or less, a b* value may be 2.0 or less, a modulus measured according to ASTM D882 may be 3 GPa or more, and an break elongation measured according to ASTM D882 may be 5% or more.

The window cover film may further include a hard coating layer formed on a surface opposite to the surface of the base layer on which the antistatic layer is formed.

The hard coating layer may have a water contact angle of 100° or more and a pencil hardness of 2 H or higher.

In the window cover film including the polyimide-based base layer, the antistatic layer, and the hard coating layer, a light transmittance measured at 388 nm may be 3% or more, a total light transmittance measured at 400 to 700 nm may be 86% or more, a haze may be 1.5% or less, a yellow index may be 4.0 or less, and a b* value may be 2.0 or less.

The hard coating layer may include an alicyclic epoxidized silsesquioxane-based compound.

The base layer may have a modulus measured according to ASTM D882 of 3 GPa or more, a break elongation measured according to ASTM D882 of 8% or more, a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

The base layer may include a unit derived from fluorine-based aromatic diamine, a unit derived from aromatic dianhydride, a unit derived from alicyclic dianhydride, and a unit derived from aromatic diacid dichloride.

The window cover film may further include a protective film formed on the other surface of the base layer on which the antistatic layer is formed. Specifically, the protective film, the base layer, and the antistatic layer may be stacked in the window cover film, or the protective film, the hard coating layer, the base layer, and the antistatic layer may be stacked in the window cover film.

The window cover film may further include an optically clear adhesive layer formed on the antistatic layer.

In another general aspect, there is provided a flexible display panel including the window cover film.

Other features and aspects will be apparent from the following detailed description, the drawings, and the claims.

[Detailed Description of Main Elements]

Figure 1:
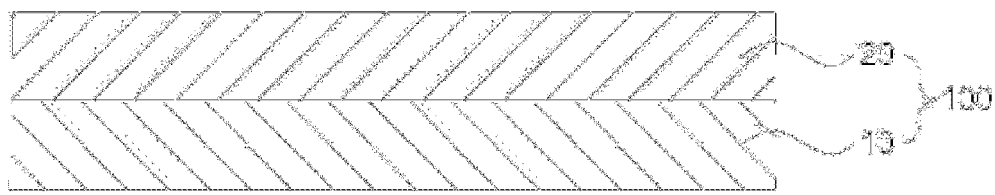
FIGS. 1 and 2 are cross-sectional views illustrating a window cover film according to a first exemplary embodiment of the present invention, and the window cover film according to the first exemplary embodiment on which a protective film is stacked, respectively.

10: Polyimide-based base layer  20: Antistatic layer
30: Hard coating layer  40: Optically clear adhesive layer
50: Protective film  60: Anti-fingerprint/anti-scratch layer
100: Window cover film according to first exemplary embodiment
200: Window cover film according to second exemplary embodiment
300: Window cover film according to third exemplary embodiment
400: Window cover film according to fourth exemplary embodiment

DETAILED DESCRIPTION OF EMBODIMENTS

Hereinafter, the present invention will be described in detail through specific exemplary embodiments or exemplary embodiments. However, the following specific exemplary embodiments or exemplary embodiments are only one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention belongs.

The terms used in the description of the present invention are only to effectively describe a specific exemplary embodiment, and are not to limit the present invention.

In addition, unless the context clearly indicates otherwise, a term in singular form used in the specification and the appended claims includes the term in plural form.

Throughout the specification describing the present invention, unless explicitly described to the contrary, "comprising" any components will be understood to imply further inclusion of other components rather than the exclusion of any other components.

The term "polyimide-based resin" in the present invention includes a polyimide resin and a polyamide-imide resin.

The inventors of the present invention have conducted many studies to prevent a peeling defect that occurs due to static electricity when a protective film is peeled off, in a case where a plastic film such as a polyimide-based film is used as a display panel window cover film.

As a result, the inventors of the present invention have solved the above problem by forming an antistatic layer satisfying a specific condition on one surface of the window cover film. Specifically, the inventors of the present invention have solved the above problem by forming an antistatic layer having a surface resistance of $1\times10^6 \Omega/\square$ or more, $1\times10^7 \Omega/\square$ or more, and more specifically, $1\times10^7$ to $1\times10^{13} \Omega/\square$, a water contact angle of 80° or less, and more specifically, 20 to 70°, and an excellent adhesive force, on one surface of the window cover film, for example, one surface of a polyimide-based base layer, without changing optical properties of the window cover film, for example, optical properties such as a light transmittance and a yellow index.

Hereinafter, the specific exemplary embodiments of the present invention will be described with reference to the drawings, and the exemplary embodiment of the present invention is not limited as long as a window cover film of a flexible display panel has a polyimide-based base layer and an antistatic layer formed on one surface of the polyimide-based based layer.

Figure 2:
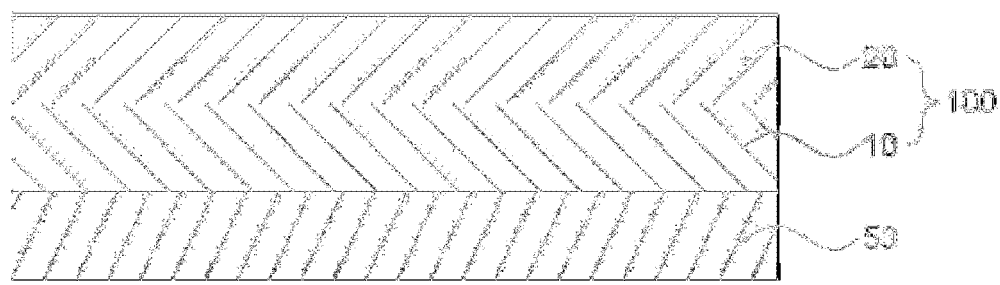

FIGS. 1 and 2 are cross-sectional views illustrating a window cover film according to a first exemplary embodiment of the present invention. As illustrated in FIG. 1, the window cover film according to the present exemplary embodiment includes a polyimide-based base layer 10 and an antistatic layer 20 formed on one surface of the polyimide-based base layer 10. FIG. 2 illustrates a state where a protective film 50 is attached to the other surface of the polyimide-based base layer 10.

The window cover film according to the present exemplary embodiment may have a light transmittance measured at 388 nm according to ASTM D1746 of 3% or more, a total light transmittance measured at 400 to 700 nm according to ASTM D1746 of 87% or more, 88% or more, or 89% or more, a haze measured according to ASTM D1003 of 1.5% or less, 1.2% or less, or 1.0% or less, a yellow index measured according to ASTM E313 of 4.0 or less, 3.0 or less, or 2.0 or less, and a value measured according to ASTM E313 of 1.5 or less or 1.2 or less.

Hereinafter, the base layer, the antistatic layer, and the protective film according to the present exemplary embodiment will be described in more detail with reference to FIG. 1.

<Base Layer>

The base layer has excellent optical properties and mechanical properties, and may be formed of a material having an elastic force and a restoring force.

In the present exemplary embodiment, a thickness of the base layer may be 10 to 500 μm, 20 to 250 μm, or 30 to 100 μm.

In the present exemplary embodiment, the base layer may have a modulus measured according to ASTM D882 of 3 GPa or more, 4 GPa or more, or 5 GPa or more, a break elongation measured according to ASTM D882 of 8% or more, 12% or more, or 15% or more, a light transmittance measured at 388 nm according to ASTM D1746 of 5% or more or 5 to 80%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a b* value measured according to ASTM E313 of 2.0 or less, 1.3 or less, or 0.4 to 1.3.

In the present exemplary embodiment, the base layer is formed of a polyimide-based resin, in particular, a polyimide-based resin having a polyamide-imide structure.

In addition, the base layer may be more preferably formed of a polyamide-imide-based resin having a fluorine atom and an aliphatic cyclic structure, and thus, the base layer may have excellent mechanical properties and dynamic bending properties.

As a more specific example, the base layer may include a polyamide-imide-based resin derived from fluorine-based aromatic diamine, aromatic dianhydride, alicyclic dianhydride, and aromatic diacid dichloride.

In the present exemplary embodiment, as an example of the polyamide-imide-based resin having the fluorine atom and the aliphatic cyclic structure, in a case where an amine-terminated polyamide oligomer derived from first fluorine-based aromatic diamine and aromatic diacid dichloride is produced, and a polyamide-imide polymer is produced by polymerizing the amine-terminated polyamide oligomer and monomers derived from second fluorine-based aromatic diamine, aromatic dianhydride, and alicyclic dianhydride, the object of the present invention is better achieved, which is preferable. The first fluorine-based aromatic diamine and the second fluorine-based aromatic diamine may be of the same or different types.

In the present exemplary embodiment, in a case where an amine-terminated oligomer in which an amide structure is formed in a polymer chain by aromatic diacid dichloride is included in a diamine monomer, the optical properties, and in particular, mechanical strength such as a modulus, may be improved, and the dynamic bending properties may be further improved.

In the present exemplary embodiment, when the resin has a polyamide oligomer block as described above, a molar ratio of the diamine monomer including the amine-terminated polyamide oligomer and the second fluorine-based aromatic diamine to the dianhydride monomer including the aromatic dianhydride and the alicyclic dianhydride of the present invention is preferably 1:0.8 to 1.1, and more preferably 1:0.9 to 1. In addition, a content of the amine-terminated polyamide oligomer with respect to a total content of the diamine monomer is not particularly limited, but is 30 mol % or more, preferably 50 mol % or more, and more preferably 70 mol % or more, in terms of achieving the mechanical properties, the yellow index, and the optical properties of the present invention. In addition, when a polyamide-imide film having a difference in surface energy according to the present invention is provided, selectivity of a coating solvent may be increased by a variety of solubilities. In addition, a composition ratio of the aromatic dianhydride to the alicyclic dianhydride is not particularly limited, and is preferably 30 to 80 mol %:70 to 20 mol %, in consideration of achieving the transparency, the yellow index, and the mechanical properties of the present invention, but the present invention is not limited thereto.

In addition, as another example, the polyamide-imide-based resin including the fluorine atom and the aliphatic cyclic structure may be a polyamide-imide-based resin obtained by mixing, polymerizing, and imidizing fluorine-based aromatic diamine, aromatic dianhydride, alicyclic dianhydride, and aromatic diacid dichloride. Such a resin has a random copolymer structure. A content of the aromatic diacid dichloride may be 40 moles or more, preferably 50 to 80 moles, with respect to 100 moles of diamine. A content of the aromatic dianhydride may be to 50 moles with respect to 100 moles of the diamine. A content of the alicyclic dianhydride may be 10 to 60 moles with respect to 100 moles of the diamine. The polyamide-imide-based resin may be prepared by polymerizing diacid dichloride and dianhydride with respect to the diamine monomer at a molar ratio of 1:0.9 to 1.1, and more preferably 1:1. A random polyamide-imide of the present invention is different in the optical properties such as transparency, the mechanical properties, and the solvent sensitivity due to a difference in surface energy from the block polyamide-imide resin, but may also fall within the scope of the present invention.

In the present exemplary embodiment, a mixture of 2,2'-bis(trifluoromethyl)-benzidine and another known aromatic diamine may be used as the fluorine-based aromatic diamine, but 2,2'-bis(trifluoromethyl)-benzidine may be used alone. By using such a fluorine-based aromatic diamine, the optical properties and the yellow index of the polyamide-imide-based film may be improved. In addition, a tensile modulus of the polyamide-imide-based film may be improved, and thus mechanical strength of the window cover film may be improved and dynamic bending properties may be further improved.

The aromatic dianhydride may be one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2, 3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In the present exemplary embodiment, in the case where the amide structure is formed in the polymer chain by the aromatic diacid dichloride, the optical properties, and in particular, the mechanical strength such as a modulus, may be greatly improved, and the dynamic bending properties may be further improved.

The aromatic diacid dichloride may be a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature of the polyimide resin is not limited, but may be 300 to 400° C., and more specifically, 330 to 380° C. Within the above ranges, a film having a high modulus, excellent mechanical strength, excellent optical properties, and less curl may be provided, which is preferable, but the present invention is not particularly limited thereto.

Hereinafter, a method of producing the base layer will be described.

In the present exemplary embodiment, the base layer may be produced by applying a "polyimide-based resin solution" including a polyimide-based resin and a solvent onto a base material, and drying or drying and stretching the base material. That is, the base layer may be produced by a solution casting method.

As an example, the base layer may be produced by a method including a step of producing an oligomer by reacting fluorine-based aromatic diamine with aromatic diacid dichloride, a step of producing a polyamic acid solution by reacting the produced oligomer, fluorine-based aromatic diamine, aromatic dianhydride, and alicyclic dianhydride with each other, a step of preparing a polyamide-imide resin by imidizing the polyamic acid solution, and a step of forming a film by applying a polyamide-imide solution obtained by dissolving the polyamide-imide resin in an organic solvent.

Hereinafter, the respective steps will be described in more detail by using a case in which a block polyamide-imide film is produced, as an example.

The step of producing the oligomer may include a step of reacting fluorine-based aromatic diamine with aromatic diacid dichloride in a reactor and a step of purifying and drying the obtained oligomer. In this case, the fluorine-based aromatic diamine may be introduced at a molar ratio of 1.01 to 2 relative to the aromatic diacid dichloride to produce an amine-terminated polyamide oligomer monomer. A molecular weight of the oligomer monomer is not particularly limited, but, for example, when a weight average molecular weight thereof is within a range of 1,000 to 3,000 g/mol, the film may have more excellent physical properties.

In addition, an aromatic carbonyl halide monomer such as terephthaloyl chloride or isophthaloyl chloride rather than terephthalic acid ester or terephthalic acid itself is preferably used to introduce an amide structure, which seems to affect the physical properties of the film by a chloride element, although the reason is not clear.

Next, the step of producing the polyamic acid solution may be performed by a solution polymerization reaction in which the produced oligomer, fluorine-based aromatic diamine, aromatic dianhydride, and alicyclic dianhydride are reacted with each other in an organic solvent. For example, the organic solvent used for the polymerization reaction in this case may be one or two or more polar solvents selected from the group of consisting of dimethylacetamide (DMAc), N-methyl-2-pyrrolidone (NMP), dimethylformamide (DMF), dimethylsulfoxide (DMSO), ethyl cellosolve, methyl cellosolve, acetone, ethylacetate, and m-cresol.

Next, the step of preparing the polyamide-imide resin by imidizing the polyamic acid solution may be performed through chemical imidization. More preferably, the polyamic acid solution is chemically imidized using pyridine and acetic anhydride. Subsequently, the polyamic acid solution may be imidized using an imidization catalyst and a dehydrating agent at a low temperature of 150° C. or lower, preferably 100° C. or lower, and specifically, 50 to 150° C.

In the case where the polyamic acid solution is imidized by such a method, mechanical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamide-imide resin may be prepared by mixing the polyamic acid solution with an additive such as a retardant, an adhesive enhancer, an inorganic particle, an antioxidant, an ultraviolet stabilizer, or a plasticizer.

In addition, after the imidization is performed, the resin may be purified using the solvent to obtain a solid content, and the solid content may be dissolved in a solvent, thereby obtaining a polyamide-imide solution. The solvent may include, for example, N,N-dimethylacetamide (DMAc) and the like, but the present invention is not limited thereto.

The step of forming the film of the polyamide-imide solution is performed by applying the polyamide-imide solution onto a base material and drying the polyamide-imide solution in a drying step divided into a drying region. In addition, a stretching step may be performed before or after the drying step, or a heat treatment step may be further performed after the drying or stretching step, if necessary. For example, glass, stainless steel, or a film may be used as the base material, but the present invention is not limited thereto. The application may be performed by a die coater, an air knife, a reverse roll, a spray, a blade, casting, gravure, spin coating, or the like.

<Antistatic Layer>

Next, the antistatic layer according to the present exemplary embodiment will be described in detail.

In the present exemplary embodiment, the antistatic layer may be disposed on at least one surface of the base layer. The antistatic layer has an excellent antistatic property and adhesion enhancement property, such that adhesion with an adhesive material may be increased, thereby preventing delamination of contact surfaces between the respective layers of the window cover film that may occur during a process such as a process of peeling a protective film. In addition, an adhesive of the protective film may be prevented from remaining.

In the present exemplary embodiment, the antistatic layer has physical properties in which a surface resistance is $1\times10^6$ Ω/□ or more and a water contact angle is 80° or less. More specifically, the surface resistance of the antistatic layer may be $1\times10^7$ Ω/□ or more or $1\times10^7$ to $1\times10^{13}$ Ω/□, and the water contact angle of the antistatic layer may be 20 to 70°. Still more specifically, the surface resistance of the antistatic layer may be $1\times10^8$ to $1\times10^{12}$ Ω/□, and the water contact angle of the antistatic layer may be 25 to 67°. Within the above ranges, only the protective film may be more easily peeled off without a peeling defect in which an optically clear adhesive layer such as an optically clear adhesive (OCA) layer or an optically clear resin (OCR) layer stacked on the window cover film is peeled off by a change of an adhesive force of the protective film due to static electricity, or an influence on another layer, which is preferable.

In the present exemplary embodiment, a thickness of the antistatic layer may be 1 nm to 1 μm, more specifically, 30 to 700 nm, and still more specifically, 50 to 500 nm. Within the above ranges, it may be suitable for exhibiting an antistatic property without increasing a thickness of the entire film.

In the present exemplary embodiment, the antistatic layer includes a siloxane-based resin or a silane-based resin which is a hydrolysis condensation reaction product of an alkoxysilane-based compound, and an organic acid or an organic acid salt. A polysiloxane-based resin is used as a main component, such that the excellent optical properties of the base layer may not be damaged.

In the present exemplary embodiment, the polysiloxane-based resin may have a weight average molecular weight of 10,000 to 100,000 g/mol or 60,000 to 80,000 g/mol, such that the optical properties such as a transmittance and a haze may be further improved.

Commercially available products such as Colcoat N-103X, PC-309, PS-169, PS-162E, PC-291, PC-301, and PS-903 (Colcoat Co., Ltd.) may be used as the siloxane-based resin.

In addition, in the present exemplary embodiment, the antistatic layer may include a modified carbon nanotube whose surface is treated with an inorganic acid. A content of the modified carbon nanotube whose surface is treated with the inorganic acid with respect to 100 parts by weight of the siloxane resin which is a matrix binder is not particularly limited. When the content of the modified carbon nanotube whose surface is treated with the inorganic acid is 0.01 to 5 parts by weight, and more preferably, 0.1 to 3 parts by weight, with respect to 100 parts by weight of the siloxane resin, only the antistatic property is preferably exhibited without inhibiting the optical properties or the mechanical properties of the window cover film, such that the peeling defect when the protective film is peeled off may be solved, which is more preferable.

The modified carbon nanotube whose surface is treated with the inorganic acid according to the present invention may be a single-walled or multi-walled carbon nanotube, a length thereof may be 1 μm to 50 μm, and an average diameter thereof may be 1 nm to 100 nm. Within the above range, dispersibility may be excellent without greatly increasing the thickness of the antistatic layer, which is preferable, but the present invention is not limited thereto.

Hereinafter, a method of forming the antistatic layer will be described in detail. However, this is only for illustrating the present invention, and the present invention is not limited to the method described below.

The antistatic layer may be formed by coating an antistatic coating composition on a base layer and drying the antistatic coating composition.

In the present exemplary embodiment, the antistatic coating composition for forming an antistatic layer includes a siloxane-based resin or a silane-based resin which is a hydrolysis condensation reaction product of an alkoxysilane-based compound, and a compound including an organic acid or an organic acid salt.

More specifically, the coating composition includes a siloxane-based resin and a solvent, or a siloxane-based resin, a compound including an organic acid or an organic acid salt, and a solvent. A solid content of the coating composition may be, for example, 0.1 to 5 wt %.

Non-limiting examples of the solvent may include alcohols such as methyl alcohol, ethyl alcohol, isopropyl alcohol, butyl alcohol, methyl cellosolve, and ethyl cellosolve; ketones such as methyl ethyl ketone, methyl butyl ketone, methyl isobutyl ketone, diethyl ketone, dipropyl ketone, and cyclohexanone; alkanes such as hexane, heptane, and octane; and benzenes such as benzene, toluene, and xylene. These solvents may be used alone or as a mixture of two or more thereof.

In addition, in the present exemplary embodiment, in a case where a compound such as an organic acid salt is used, a content of the compound is not limited as long as a surface resistance of the compound to the siloxane-based resin is in the range of the surface resistance of the present exemplary embodiment, but may be 0.01 to 50 parts by weight with respect to 100 parts by weight of the siloxane-based resin. Next, the siloxane-based resin which is the matrix binder of the antistatic layer will be described.

An alkoxysilane-based compound used for forming the siloxane-based resin may be represented by a general formula of $SiR_a(OR_1)_b$, wherein R and $R_1$ may be a C1-C6 alkyl group, a C6-C20 aromatic group, or a C1-C6 alkyl group substituted with an aromatic group, a may be 0, 1, 2, or 3, and b may be 1, 2, 3, or 4.

More specifically, the alkoxysilane compound may be one or more selected from tetraalkoxysilane, alkyltrialkoxysilane, dialkyldialkoxysilane, trialkylmonoalkoxysilane, phenyltrialkoxysilane, diphenyldialkoxysilane, and triphenylalkoxysilane. The siloxane-based resin may be prepared by hydrolyzing such an alkoxysilane in the presence of an acid catalyst.

More specifically, the siloxane-based resin may be a compound obtained by polycondensation of tetraalkoxysilane alone, or a compound obtained by polycondensation of an alkoxysilane-based compound including 50 wt % or more, and preferably 70 wt % or more of tetraalkoxysilane, and 50 wt % or less, and preferably wt % or less of an alkoxysilane compound selected from trialkoxysilane, dialkoxysilane, and monoalkoxysilane. In this case, the antistatic layer may have flexibility, transparency, and excellent mechanical properties.

In addition, the organic acid or organic acid salt compound may be an organic sulfonic acid represented by the following Formula 1 or a salt compound thereof, and in this case, the flexibility and the antistatic property of the antistatic layer may be further reinforced.

[Formula 1]

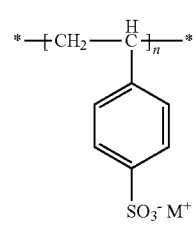

wherein M is selected from a metal cation, and n is 1 to 100,000.

In addition, as described above, a modified carbon nanotube whose surface is treated with an inorganic acid may be added to the coating composition, if necessary, so as to further improve the antistatic property.

In the present exemplary embodiment, the antistatic coating composition may further include an additive such as a slip agent, an antioxidant, a UV absorber, a light stabilizer, a thermal polymerization inhibitor, a leveling agent, a surfactant, a lubricant, or an antifoulant.

A coating process for forming the antistatic layer may be performed by using a method such as bar coating, flow coating, die coating, or spray coating, but the present invention is not limited thereto.

<Protective Film>

In the present exemplary embodiment, it is required for the protective film to be easily peeled off when used, while preventing a surface defect due to movement such as separation of the protective film or sliding of the protective film by an external force when the protective film is moved or stored to protect the surface of the window cover film. Therefore, adhesion with the base layer is preferably 2 gf/inch to 20 gf/inch, and more preferably 3 to 15 gf/inch.

An acrylic component, a urethane-based component, or a silicone-based component may be used as an adhesive component of the protective layer. It is preferable to use an adhesive component having high-temperature or high-temperature and high-humidity stability and no residue after long-term attachment.

Commercially available products of the protective film, such as E-MASK®, RB-100S, RB-200S, R-50EP, AW303EB, and AW343EB (Nitto Denko Corporation), and 7111, 7121, 7131, 7332, 7412, 7531, 7532, and 7721 (Toray Industries, Inc.) may be used, but the present invention is not limited thereto.

Figure 3:
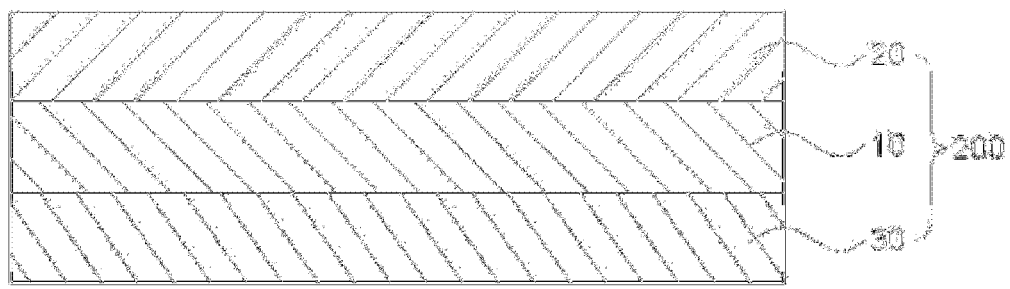
FIGS. 3 and 4 are cross-sectional views illustrating a window cover film according to a second exemplary embodiment of the present invention, and the window cover film according to the second exemplary embodiment on which a protective film is stacked, respectively.
Figure 4:
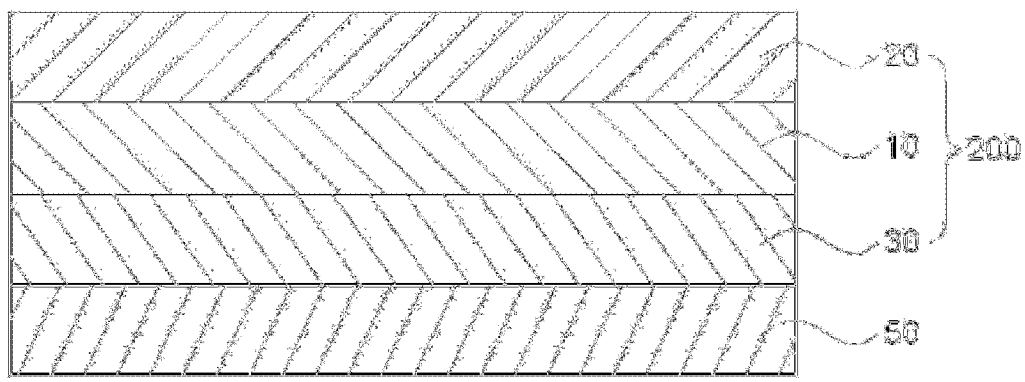

FIG. 3 is a cross-sectional view illustrating a window cover film according to a second exemplary embodiment of the present invention, and FIG. 4 is a cross-sectional view illustrating the window cover film of FIG. 3 to which a protective film 50 is attached.

As illustrated in FIG. 3, the window cover film according to the present exemplary embodiment includes a polyimide-based base layer 10, an antistatic layer 20 formed on one surface of the polyimide-based base layer 10, and a hard coating layer 30 formed on the other surface of the polyimide-based base layer 10.

The window cover film according to the present exemplary embodiment has a light transmittance measured at 388 nm according to ASTM D1746 of 5% or more, and a total light transmittance measured at 400 to 700 nm according to ASTM D1746 of 87% or more, 88% or more, or 89% or more. In addition, the window cover film has a haze measured according to ASTM D1003 of 1.5% or less, 1.2% or less, or 1.0% or less. In addition, the window cover film has a yellow index measured according to ASTM E313 of 4.5 or less, 3.5 or less, or 2.5 or less, and a value measured according to ASTM E313 of 2.0 or less, 1.5 or less, or 1.2 or less.

In addition, when an operation in which the surface on which the hard coating layer is formed is repeatedly folded against a stainless steel cylinder is performed 100,000 times, cracks may not occur in a cylinder having a radius of 5 mm, 4 mm, or 3 mm, and when an operation in which a surface opposite to the surface on which the hard coating layer is formed is repeatedly folded against a stainless steel cylinder is performed 100,000 times, cracks may not occur in a cylinder having a radius of 5 mm, 4 mm, or 3 mm.

When the hard coating layer having the above properties is used for the window cover film of the display panel, the optical properties and viewing angle characteristics of the window cover film may be improved, and the adhesion and peelability with the protective film formed on the hard coating layer are preferably balanced, such that a defect may be prevented, which is preferable.

Since the configurations and production methods of the base layer and the antistatic layer are the same as those of the first exemplary embodiment, the description thereof will be omitted, and the hard coating layer will be described in detail.

<Hard Coating Layer>

The hard coating layer according to the present exemplary embodiment is formed to protect the base layer having the excellent optical properties and mechanical properties from external physical and chemical damage.

In the present exemplary embodiment, the hard coating layer may have a thickness of 1 to 50% of the entire thickness of the window cover film. Specifically, the thickness of the hard coating layer may be, for example, 1 to 50 μm, and more specifically, 2 to 50 μm. When the thickness of the hard coating layer is within the above ranges, the window cover film has excellent hardness, and the optical properties of the window cover film may be maintained. More preferably, the thickness of the hard coating layer may be 1 to 30 μm. When the thickness of the hard coating layer is within the above ranges, the hard coating layer may maintain flexibility while having the excellent hardness, such that curl may not substantially occur.

In addition, a pencil hardness of the hard coating layer may be 2 H or higher, 3 H or higher, or 4 H or higher. When a scratch test is performed using steel wool (#0000, Liberon Limited), scratches are not generated at 10 times/1 Kgf, 20 times/1 Kgf, or 30 times/1 Kgf. A water contact angle of the hard coating layer may be 80° or more, 90° or more, or 100° or more.

In the present exemplary embodiment, the hard coating layer includes a silsesquioxane-based compound as a main component. More specifically, the silsesquioxane-based compound may be an alicyclic epoxidized silsesquioxane-based compound.

In this case, a weight average molecular weight of the silsesquioxane-based compound may be 1,000 to 20,000 g/mol. When the weight average molecular weight of the silsesquioxane-based compound is within the above range, the composition for forming a hard coating layer may have an appropriate viscosity. Therefore, flowability, coatability, and curing reactivity of the composition for forming a hard coating layer may be improved. In addition, the hardness of the hard coating layer may be improved. In addition, flexibility of the hard coating layer is improved, such that an occurrence of curl may be prevented. Preferably, the weight average molecular weight of the silsesquioxane-based compound may be 1,000 to 18,000 g/mol, and more preferably, 2,000 to 15,000 g/mol. The weight average molecular weight is measured using gel permeation chromatography (GPC).

The silsesquioxane-based compound includes, for example, a trialkoxysilane compound-derived repeating unit represented by the following Formula 2.

 [Formula 2]

wherein A represents C1-C10 linear or branched alkyl group in which a C3-C7 alicyclic alkyl group is substituted with epoxy, and R is independently a C1-C3 alkyl group.

Here, the alkoxysilane compound may be one or more selected from 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in the present exemplary embodiment, the silsesquioxane-based compound may include a trialkoxysilane compound-derived repeating unit represented by Formula 2 and a dialkoxysilane compound-derived repeating unit represented by the following Formula 3. In this case, the silsesquioxane-based compound may be prepared by mixing 0.1 to 100 parts by weight of the dialkoxysilane compound with respect to 100 parts by weight of the trialkoxysilane compound and performing condensation polymerization of the mixture. In this case, surface hardness is increased and the bending properties are significantly improved.

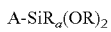   [Formula 3]

wherein $R_a$ is a linear or branched alkyl group selected from C1 to C5, and A and R are as defined in Formula 2.

Specific examples of the compound of Formula 3 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, and 2-(3,4-epoxycyclopentyl)ethylmethyldiethoxysilane, but the present invention is not limited thereto. These compounds may be used alone or as a mixture of two or more thereof.

In addition, in the present exemplary embodiment, the hard coating layer may include an inorganic filler. For example, metal oxide such as silica, alumina, or titanium oxide; hydroxide such as aluminum hydroxide, magnesium hydroxide, or potassium hydroxide; a metal particle such as gold, silver, copper, nickel, or alloys thereof; a conductive particle such as carbon, carbon nanotube, or fullerene; glass; or ceramic may be used as the inorganic filler. Preferably, silica may be used in terms of compatibility of the composition with another component. These inorganic fillers may be used alone or as a mixture of two or more thereof.

In addition, the hard coating layer may further include a slip agent. The slip agent may improve winding efficiency, blocking resistance, abrasion resistance, scratch resistance, or the like. For example, waxes such as polyethylene wax, paraffin wax, synthetic wax, and montan wax; and synthetic resins such as a silicone-based resin and a fluorine-based resin may be used as the slip agent. These slip agents may be used alone or as a mixture of two or more thereof.

Hereinafter, a method of forming the hard coating layer will be described in detail. The hard coating layer is formed by preparing a composition for forming a hard coating layer, and applying and curing the composition onto a base layer.

In the present exemplary embodiment, the composition for forming a hard coating layer includes silsesquioxane, a cross-linking agent, and a photoinitiator.

In addition, the composition for forming a hard coating layer may further include an epoxy-based monomer, a photoinitiator and/or a thermal initiator, a solvent, a thermosetting agent, an inorganic filler, a slip agent, an antioxidant, a UV absorber, a light stabilizer, a thermal polymerization inhibitor, a leveling agent, a surfactant, a lubricant, or an antifoulant.

The cross-linking agent may form a cross-linking bond with an epoxy siloxane-based resin to solidify the composition for forming a hard coating layer, such that the hardness of the hard coating layer may be increased.

For example, the cross-linking agent may contain a compound represented by the following Formula 4. The cross-linking agent, which is an alicyclic epoxy compound having the same epoxy unit as those in structures of Formula 2 and Formula 3, promotes cross-linking bonding and allows the hard coating layer to maintain a refractive index, such that a viewing angle may not be changed and transparency of the hard coating layer may not be damaged, which is preferable.

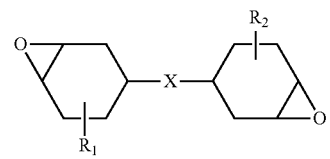   [Formula 4]

wherein $R_1$ and $R_2$ each independently may represent hydrogen or a linear or branched alkyl group having 1 to 5 carbon atoms, and X may be a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

Here, the "direct bond" refers to a structure which is directly bonded without other functional groups. For example, in Formula 4, the direct bond may refer to two cyclohexanes directly connected to each other. In addition, the "connecting group" refers to two or more above-described substituents connected to each other. In addition, in Formula 4, substitution positions of $R_1$ and $R_2$ are not particularly limited, but when the carbon connected to X is set at position 1, and the carbons connected to an epoxy group are set at positions 3 and 4, it is preferable that $R_1$ and $R_2$ are substituted at position 6.

The above-described compounds include a cyclic epoxy structure in a molecule, and when the epoxy structure is formed in a linear shape as in Formula 4, a viscosity of the composition may be reduced to an appropriate range. When the viscosity is reduced, the coatability of the composition may be improved and the reactivity of the epoxy group is also further improved, such that a curing reaction may be promoted. In addition, cross-linking bonding with the epoxy siloxane resin is formed to improve the hardness of the hard coating layer.

A content of the cross-linking agent is not particularly limited, and for example, may be 1 to 150 parts by weight with respect to 100 parts by weight of the epoxy siloxane resin. When the content of the cross-linking agent is within the above range, the viscosity of the composition may be maintained in an appropriate range, and coatability and curing reactivity may be improved.

In addition, in the present exemplary embodiment, various epoxy compounds may be added to the hard coating layer in addition to the above-described compounds of the formulas, as long as the characteristics of the present invention are achieved, but a content thereof is preferably less than 20 parts by weight with respect to 100 parts by weight of the compound of Formula 2.

In the present exemplary embodiment, the epoxy-based monomer may be included in an amount of 10 to 80 parts by weight with respect to 100 parts by weight of the composition for forming a hard coating layer. Within the above content range, the viscosity may be adjusted, the thickness may be easily adjusted, a surface may be uniform, a defect in a thin film does not occur, and the hardness is sufficiently achieved, but the present invention is not limited thereto.

In the present exemplary embodiment, the photoinitiator is a photo-cationic initiator. The photo-cationic initiator may initiate condensation of the epoxy-based monomer including the above-described compounds. As the photo-cationic initiator, for example, an onium salt and/or an organic metal salt may be used, but the present invention is not limited thereto. For example, a diaryliodonium salt, a triarylsulfonium salt, an aryldiazonium salt, an iron-arene complex, or the like may be used. These photo-cationic initiators may be used alone or as a mixture of two or more thereof.

A content of the photoinitiator is not particularly limited, and for example, may be 0.1 to 10 parts by weight, and more preferably 1 to 5 parts by weight, with respect to 100 parts by weight of the compound of Formula 1.

In the exemplary embodiment, non-limiting examples of the solvent may include alcohols such as methanol, ethanol, isopropanol, butanol, methyl cellosolve, and ethyl cellosolve; ketones such as methyl ethyl ketone, methyl butyl ketone, methyl isobutyl ketone, diethyl ketone, dipropyl ketone, and cyclohexanone; hexanes such as hexane, heptane, and octane; and benzenes such as benzene, toluene, and xylene. These solvents may be used alone or as a mixture of two or more thereof.

In the present exemplary embodiment, the solvent may be included in a residual amount excluding the amount of the remaining components in a total weight of the composition.

As an exemplary embodiment, the composition for forming a hard coating layer may further include a thermosetting agent. Examples of the thermosetting agent may include a sulfonium salt-based thermosetting agent, an amine-based thermosetting agent, an imidazole-based thermosetting agent, an acid anhydride-based thermosetting agent, and an amide-based thermosetting agent. It is preferable that a sulfonium salt-based thermosetting agent may be further used in terms of implementing discoloration prevention and high hardness. These thermosetting agents may be used alone or as a mixture of two or more thereof. A content of the thermosetting agent is not particularly limited, and may be, for example, 5 to 30 parts by weight with respect to 100 parts by weight of the epoxy siloxane resin. When the content of the thermosetting agent is within the above range, curing efficiency of the composition for forming a hard coating layer is further improved, such that a hard coating layer having excellent hardness may be formed.

In the present exemplary embodiment, a hydrolysis condensate of the alkoxysilane-based compound is used and designed structurally similar to an epoxidized silsesquioxane cured product of the hard coating layer of the present invention which is located on a lower surface of the base layer, such that the optical properties of the base layer are not damaged, which is more preferable.

Figure 5:
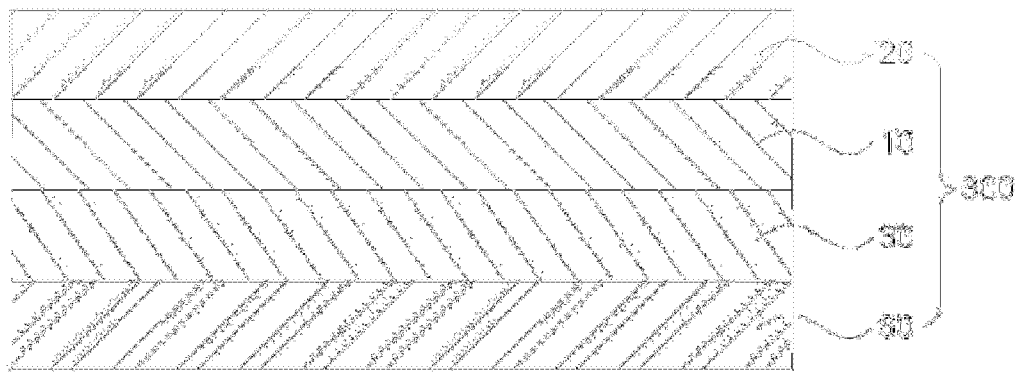
FIGS. 5 and 6 are cross-sectional views illustrating a window cover film according to a third exemplary embodiment of the present invention, and the window cover film according to the third exemplary embodiment on which a protective film is stacked, respectively.
Figure 6:
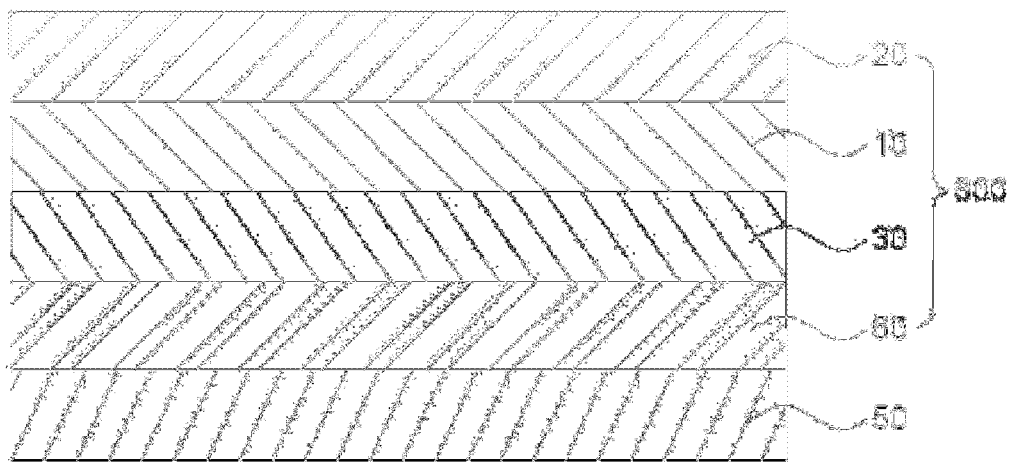

FIG. 5 is a cross-sectional view illustrating a window cover film according to a third exemplary embodiment of the present invention, and FIG. 6 is a cross-sectional view illustrating the window cover film according to the third exemplary embodiment to which a protective film 50 is attached.

As illustrated in FIG. 5, the window cover film according to the present exemplary embodiment includes a base layer 10, an antistatic layer 20 formed on one surface of the base layer 10, and a hard coating layer 30 and an anti-fingerprint/anti-scratch layer 60 that are sequentially formed on the other surface of the base layer 10. Since configurations of the base layer, the antistatic layer, and the hard coating layer are the same as those of the first and second exemplary embodiments, the description thereof will be omitted, and the anti-fingerprint/anti-scratch layer will be described below in detail.

<Anti-Fingerprint/Anti-Scratch Layer>

In the present exemplary embodiment, the anti-fingerprint/anti-scratch layer includes a fluorine-substituted silsesquioxane resin. Therefore, the window cover film may have both fingerprint resistance and scratch resistance while maintaining or improving the optical properties of the window cover film.

The fluorine-substituted silsesquioxane resin is a silsesquioxane resin substituted with fluorine, and may be, for example, a silicon atom of a silsesquioxane resin that is directly substituted with fluorine, or a substituent substituted for a silicon atom, for example, an alkyl group substituted with fluorine. In other words, the fluorine-substituted silsesquioxane resin may be a silicon atom to which a fluorinated alkyl group is connected.

The fluorine-substituted silsesquioxane resin may impart excellent water-repellent, waterproof, and oil-repellent functions to the anti-fingerprint/anti-scratch layer and may exhibit an excellent antifouling property.

In the present exemplary embodiment, a water contact angle of the anti-fingerprint/anti-scratch layer may be 105° or more. In addition, the anti-fingerprint/anti-scratch layer may have excellent hardness, friction resistance, and curl suppression property. In addition, a silsesquioxane skeleton of the fluorine-substituted silsesquioxane resin may have a structure similar to that of the epoxy siloxane resin (for example, the silsesquioxane resin) of the hard coating layer. Therefore, an adhesive force between the anti-fingerprint/anti-scratch layer and the hard coating layer may be improved by a chemical bonding between the fluorine-substituted silsesquioxane resin and the epoxy siloxane resin.

The fluorine-substituted silsesquioxane resin may be synthesized by three-dimensional polymerization of a fluorine-substituted silane compound. The fluorine-substituted silsesquioxane resin may include, for example, a silsesquioxane resin substituted with a 1H,1H,2H,2H-perfluorodecyl group.

A weight average molecular weight of the fluorine-substituted silsesquioxane resin may be 500 to 20,000 g/mol.

Figure 7:
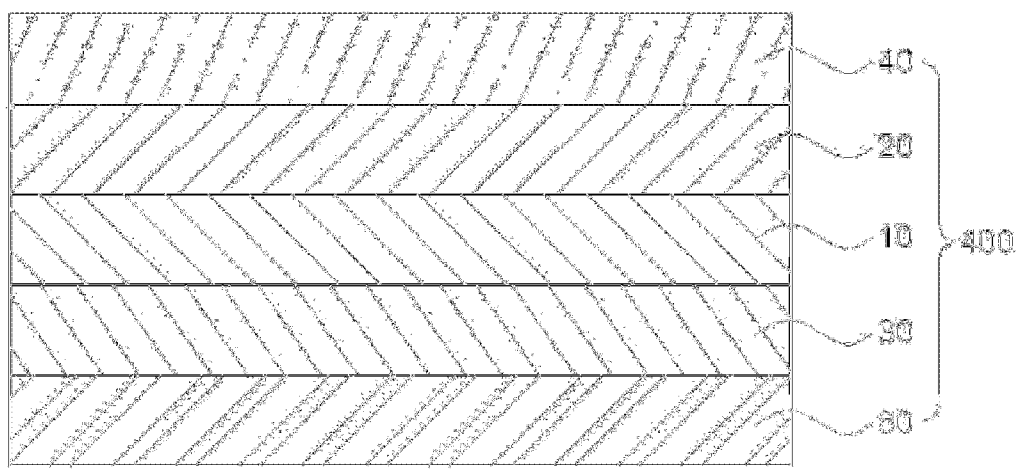
FIGS. 7 and 8 are cross-sectional views illustrating a window cover film according to a fourth exemplary embodiment of the present invention, and the window cover film according to the fourth exemplary embodiment on which a protective film is stacked, respectively.
Figure 8:
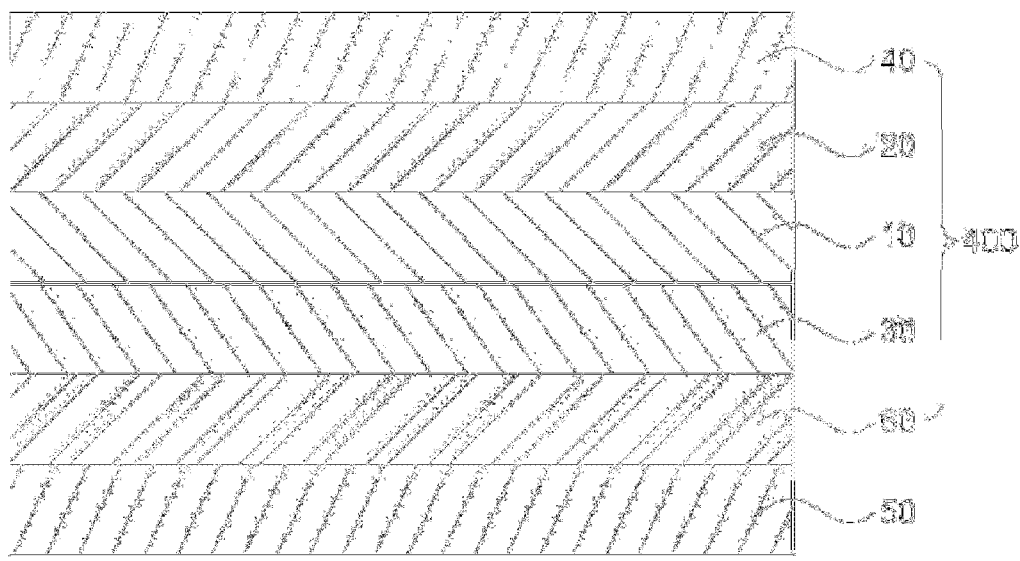

FIG. 7 is a cross-sectional view illustrating a window cover film according to a fourth exemplary embodiment of the present invention, and FIG. 8 is a cross-sectional view illustrating the window cover film according to the fourth exemplary embodiment to which a protective film 50 is attached.

As illustrated in FIG. 7, the window cover film according to the present exemplary embodiment includes a base layer 10, an antistatic layer 20 and an optically clear adhesive layer 40 that are sequentially formed on one surface of the base layer 10, and a hard coating layer 30 formed on the other surface of the base layer 10. Since configurations of the base layer, the antistatic layer, and the hard coating layer are the same as those of the above-described exemplary embodiments, the description thereof will be omitted, and the adhesive layer will be described below in detail.

<Optically Clear Adhesive Layer>

In the present exemplary embodiment, an optically clear adhesive (OCA) layer or an optically clear resin (OCR) layer may be used as the optically clear adhesive layer. It is required for the adhesive layer to adhere to the antistatic layer formed on the base layer of the present invention, attach to one adherend selected from a PET film, a COP film, a TAC film, and a polyimide film, and prevent a defect due to peeling between adhesive layers when removing the protective film. It is preferable that the adhesive layer has an adhesive force of 0.3 kgf/inch or more to minimize such a defect.

When the OCA layer is used as the adhesive layer, commercially available products such as No. 8171, 8172, 8146-1, 8146-2, 8211, 8212, and 8271 (The 3M Company), 9002D, 1002A, 1003H, and H900 (LG Chem Ltd.), and CS9862UA and CS9861UAS (Nitto Denko Corporation) may be used.

When the OCR layer is used as the adhesive layer, commercially available products such as SVR7000, SVR1241H, SVR1150, and HSVR330 (Dexerials Corporation), HRJ-46, HRJ-203, and HRJ-600 (KYORITSU ELECTRICAL INSTRUMENTS WORKS, LTD.), and InvisiSil OCS200 (Momentive Performance Materials Inc.) may be used.

Hereinafter, the present invention will be described in more detail on the basis of examples and comparative examples. However, the following examples and comparative examples are only examples for describing the present invention in more detail, and the present invention is not limited by the examples and comparative examples.

Hereinafter, physical properties were measured as follows.

1) Adhesive Force

A window cover film of each of examples was cut into a sample in a size of 25.4 mm×150 mm, a light-thin release film was peeled off from an 8146-1 OCA film (The 3M Company) and laminated with one surface of an antistatic layer of the window cover film with a force of 2 kgf/cm, a medium-thin release film was peeled off from the 8146-1 OCA film, after peeling off the middle-thin release film, 50 mm from the edge was laminated to the polyimide film prepared in Preparation Example 1 with a force of 2 kgf/cm, the polyimide film was left at room temperature for 30 minutes, and then a T-peel test was performed at a peeling rate of 300 mm/min using a UTM (3365, Instron Corporation) to measure a peeling force between a surface of the antistatic layer and a surface of the polyimide film.

2) Evaluation of Peelability

A protective film whose adhesive force to the polyimide film produced in Production Example 1 was 12 gf/mm (RB-200S, Nitto Denko Corporation) was laminated with a surface opposite to the surface of the window cover film of each example on which the antistatic layer was formed, and 50 samples in a size of 25.4 mm×150 mm were produced, the samples were left at room temperature for 24 hours, and then a 90 degree peel test was performed at a peeling rate of 300 mm/min using the UTM (3365, Instron Corporation) to evaluate a peeling degree between the surface of the antistatic layer and a surface of the adherend (the polyimide film produced in Production Example 1) and the presence or absence of a residual protective film (⊚: all of the 50 samples are neatly peeled off, Δ: Residues are observed in 1 to 5 samples, ×: Residues are observed in more than 6 samples).

3) Water Contact Angle

A water contact angle was measured by dropping water on a surface of a coating layer of the film using a contact angle meter (MSA, KRUSS GmbH).

4) Measurement of Surface Resistance

A surface resistance of the coating layer of the antistatic layer was measured 5 times according to JIS K6911 in an environment of 25° C. and 50% using a surface resistance meter (HIRESTA-UX, Mitsubishi Chemical Corporation), and an average value thereof was obtained. A unit of the surface resistance is Ω/□.

5) Modulus/Break Elongation

A modulus and a break elongation were measured under a condition in which the polyamide-imide film having a length of 50 mm and a width of 10 mm was pulled according to ASTM D882 at 25° C. and 50 mm/min using the UTM 3365 (Instron Corporation).

A thickness of the film was measured, and data of a value thereof was input to the device. A unit of the modulus is GPa, and a unit of the break elongation is %.

6) Light Transmittance

For the film having a thickness of 50 μm, a total light transmittance measured in the entire wavelength region of 400 to 700 nm and a single wavelength light transmittance measured at 338 nm were measured according to ASTM D1746 using a spectrophotometer (COH-400, Nippon Denshoku Industries Co., Ltd.) and a UV/Vis (UV3600, Shimadzu Corporation), respectively. A unit of the light transmittance is %

7) Haze

A haze of the film having a thickness of 50 μm was measured according to ASTM D1003 using the spectrophotometer (COH-400, Nippon Denshoku Industries Co., Ltd.). A unit of the haze is %.

8) Yellow Index (YI) and b* Value

A yellow index and a b& value of the film having a thickness of 50 μm were measured according to ASTM E313 using a colorimeter (ColorQuest XE, Hunter Associates Laboratory, Inc.).

9) Weight Average Molecular Weight (Mw) and Polydispersity Index (PDI)

<Weight Average Molecular Weight of Film>

A weight average molecular weight and a polydispersity index of the produced film were measured as follows.

First, a film sample dissolved in a DMAc eluant containing 0.05 M LiBr was used as a sample.

The measurement was performed using GPC (Waters GPC system, Waters 1515 isocratic HPLC Pump, Waters 2414 Refractive Index detector), an Olexis, a Polypore, a mixed D column were connected to each other and used as a GPC Column, a DMAc solution was used as a solvent, polymethyl methacrylate (PMMA STD) was used as a standard material, and the analysis was performed at 35° C. and a flow rate of 1 mL/min.

<Weight Average Molecular Weight of Silsesquioxane Resin>

In the measurement of a weight average molecular weight of a silsesquioxane resin, GPC (Waters GPC system, Waters 1515 isocratic HPLC Pump, Waters 2414 Refractive Index detector) was used, four Shodexs KF-801, 802.5, 803, and 805 (Waters Corporation) that were connected to each other in series were used as a GPC column, THF was used as a solvent, and a rate was 1 mL/min.

12) Scratch (Evaluation of Abrasion Resistance)

The hard coating film produced in each of the examples and the comparative examples was cut into 7 cm×12 cm according to ASTM D2197 and fixed to a jig of an abrasion resistance tester (KIPAE), and steel wool (#0000, Liberon Limited) was mounted and fixed to a 2 cm×2 cm squared tip. A movement distance, a movement rate, and a load were set to 100 mm, 40 cycles/min, and 1.0 kg, respectively, the steel wool was reciprocally rubbed against a surface of an antifouling layer of the hard coating layer 10 times, and then the number of scratches on the surface was observed with the naked eye to measure the scratches on the basis of a generation of 5 or fewer scratches (regardless of a size thereof).

13) Pencil Hardness 20 mm of a line was drawn on the film produced in each of the examples and the comparative examples according to JIS K5400 at a load of 750 g and a rate of 50 mm/sec, and the drawing of the line was repeated 5 times or more, to measure a pencil hardness on the basis of a generation of 1 or fewer scratches.

[Production Example 1] Production of Base Layer

Terephthaloyl dichloride (TPC) and 2,2'-bis(trifluoromethyl)-benzidine (TFMB) were put into a solution in which dichloromethane and pyridine were mixed with each other and the mixture was stirred in a reactor under a nitrogen atmosphere at 25° C. for 2 hours. In this case, a molar ratio of TPC:TFMB was set to 300:400, and a content of a solid content was adjusted to 10 wt %. Thereafter, the reactant was precipitated in an excess amount of methanol and then filtered, and the obtained solid content was vacuum-dried at 50° C. for 6 hours or longer to obtain an oligomer. A formula weight (FW) of the produced oligomer was 1,670 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and sufficiently stirred.

After confirming that the solid raw material was completely dissolved, fumed silica (surface area: 95 m$^2$/g, <1 μm) was added to DMAc in an amount of 1,000 ppm with respect to the solid content, and the fumed silica was dispersed using ultrasonic waves and then injected into the reactor. 64.1 moles of cyclobutanetetracarboxylic dianhydride (CBDA) and 64.1 moles of 4,4'-hexafluoroisopropylidene diphthalic anhydride (6FDA) were sequentially injected into the reactor and sufficiently stirred, and then polymerization was performed at 40° C. for 10 hours. At this time, a content of the solid content was 13 wt %. Subsequently, each of pyridine and acetic anhydride was sequentially added to the solution in an amount of 2.5 moles times a total content of dianhydride, and the mixture was stirred at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining polyamide-imide powder. The powder was diluted and dissolved with DMAc at 20 wt % to prepare a composition for forming a base layer.

The composition for forming a base layer was applied onto a glass support using an applicator, dried at 80° C. for 30 minutes and 100° C. for 1 hour, and cooled at room temperature, thereby producing a film. Thereafter, the film was subjected to a stepwise heat treatment at 100 to 200° C. and 250 to 300° C. for 2 hours and a heating rate of 20° C./min.

The produced polyamide-imide film had a thickness of 50 μm, a total light transmittance of 89.73%, a haze of 0.4, a yellow index (YI) of 1.9, a b* value of 1.0, a modulus of 6.5 GPa, a break elongation of 21.2%, a weight average molecular weight of 310,000 g/mol, a polydispersity index (PDI) of 2.11, and a pencil hardness of HB.

[Preparation Example 2] Preparation of Composition for Forming Hard Coating Layer 2-(3,4-epoxycyclohexyl)ethyltrimethoxysilane (ECTMS, Tokyo chemical industry Co., Ltd.) and water were mixed with each other at a ratio of 24.64 g:2.70 g (0.1 mol:0.15 mol) to prepare a reaction solution, and the reaction solution was placed into a 250 mL 2-neck flask. 0.1 mL of tetramethylammonium hydroxide (Aldrich Corporation) as a catalyst and 100 mL of tetrahydrofuran (Aldrich Corporation) were added to the mixture and stirred at 25° C. for 36 hours. Thereafter, layer separation was performed, a product layer was extracted with methylene chloride (Aldrich Corporation), moisture was removed from extract with magnesium sulfate (Aldrich Corporation), and the solvent was vacuum-dried, thereby obtaining an epoxy siloxane-based resin. A weight average molecular weight of the epoxy siloxane-based resin was measured using gel permeation chromatography (GPC), and the measured weight average molecular weight was 2,500 g/mol.

A composition was prepared by mixing 30 g of the prepared epoxy siloxane-based resin, 10 g of (3',4'-epoxycyclohexyl)methyl 3,4-epoxycyclohexanecarboxylate and 5 g of bis[(3,4-epoxycyclohexyl)methyl]adipate as a crosslinking agent, 0.5 g of (4-methylphenyl)[4-(2-methylpropyl) phenyl]iodoniumhexafluorophosphate as a photoinitiator, and 54.5 g of methyl ethyl ketone with each other.

[Preparation Example 3] Preparation of Coating Composition for Forming Antistatic Layer 15 parts by weight of a multi-walled carbon nanotube (length: 2 μm, average diameter: 54 nm) was added to 100 parts by weight of a 50 wt % nitric acid solution, the carbon nanotube was modified at 60° C. for 4 hours, filtered, sufficiently washed with distilled water, and then dried, thereby preparing a carbon nanotube whose surface was treated with nitric acid.

Subsequently, the prepared carbon nanotube whose surface was treated with nitric acid was added in an amount of 2 parts by weight with respect to 100 parts by weight of a solid content of an antistatic coating liquid (solid content: 2.8%, viscosity: 2.8 cps/25° C., Colcoat PC-309, Colcoat Co., Ltd.) and the mixture was vigorously stirred and subjected to an ultrasonic wave treatment to sufficiently stir the mixture, thereby preparing a coating composition for forming an antistatic layer.

[Preparation Example 4] Preparation of Coating Composition for Forming Antistatic Layer A composition was prepared by adding 9 parts by weight of pentaerythritol tetraacrylate (M340, Miwon Specialty Commercial Co., Ltd.), 3 parts by weight of 1-hydroxycyclohexylphenylketone as a photoinitiator, and 18 parts by weight of a conductive polymer solution (ELcoat UVH, solid content: 30%, DaeHa ManTech Co., Ltd.) as an antistatic agent.

Example 1

Colcoat PC-309 which was an antistatic coating liquid was coated onto one surface of the base layer produced in Production Example 1 using #5 Meyer Bar, and the antistatic coating liquid was cured at a temperature of 125° C. for 1 minute, thereby forming an antistatic layer having a thickness of 200 nm.

Physical properties such as a surface resistance, a water contact angle, a peeling force of the antistatic layer, a peeling force of the protective film, and a light transmittance were measured by using the window cover film in which the produced antistatic layer was formed, and the results are shown in Table 1. As a result, the surface resistance was within a range of $1 \times 10^7$ to $1 \times 10^{13} \Omega/\square$ in which a peeling defect due to static electricity may be prevented, and the water contact angle was 60° at which the peeling force of the present invention may be excellent. In addition, the adhesive force of the base layer with the OCA layer or the OCR layer was significantly increased as compared to that of Comparative Example 1 in which an antistatic layer was not formed in the base layer. That is, the protective film was stacked, and then a peeling test of the protective film was performed. As a result, both of a residue of the protective film and a separation degree of the hard coating layer were excellent.

In addition, the light transmittance was 91%, which was significantly increased as compared to that of Comparative Example 1.

In addition, it was confirmed that the light transmittance measured at 388 nm according to ASTM E313 was 3% or more, the haze was 0.5%, the yellow index was 2.0, and the b* value was 1.5 or less, which means that the window cover film had excellent optical properties.

Example 2

The composition for forming a hard coating layer prepared in Preparation Example 2 was applied onto one surface of the base layer produced in Production Example 1 using #18 Meyer Bar, the composition was dried at 60° C. for 5 minutes, irradiated with UV at 1 J/cm$^2$ using a high-pressure metal lamp, and then cured at 120° C. for 15 minutes, thereby forming a hard coating layer having a thickness of 10 μm.

Subsequently, Colcoat PC-309 which was an antistatic coating liquid was coated onto an opposite surface of the hard coating layer using #5 Meyer Bar, and the antistatic coating liquid was cured at a temperature of 125° C. for 1 minute, thereby forming an antistatic layer having a thickness of 200 nm.

Subsequently, a peeling force and peelability of each of the antistatic layer and the OCA layer were evaluated. The results are shown in Table 1. In addition, after the protective film was stacked, a peeling test of the protective film was performed, and then, a residue and a peeling degree of a rear OCA layer were evaluated. All of the results are shown in Table 1.

As can be seen from the results shown in Table 1, as described in Example 1, the excellent physical properties were improved and the peeling defect was prevented.

Example 3

Example 3 was performed as in Example 1 except that Colcoat N-103X (Colcoat Co., Ltd.) (solid content: 2 wt %, viscosity: 2.5 cps/25° C.) was used instead of the Colcoat PC-309 (Colcoat Co., Ltd.) as the antistatic coating liquid. The results are shown in Table 1. As can be seen from the results shown in Table 1, as described in Example 1, the excellent physical properties were improved and the peeling defect was prevented.

Example 4

Example 4 was performed as in Example 1 except that Colcoat PC-291 (Colcoat Co., Ltd.) (solid content: 3.5 wt %, viscosity: 2.9 cps/25° C.) was used instead of the Colcoat PC-309 (Colcoat Co., Ltd.) as the antistatic coating liquid. The results are shown in Table 1. As can be seen from the results shown in Table 1, as described in Example 1, the excellent physical properties were improved and the peeling defect was prevented.

Example 5

Example 5 was performed as in Example 1 except that the composition for forming an antistatic layer prepared in Preparation Example 3 was used as the antistatic coating liquid. The results are shown in Table 1. As can be seen from the results shown in Table 1, as described in Example 1, the excellent physical properties were improved and the peeling defect was prevented. In addition, it was confirmed that the light transmittance measured at 388 nm according to ASTM E313 was 3% or more, the haze was 1.2% or less, the yellow index was 3.0 or less, and the b* value was 1.5 or less, which means that the window cover film had the excellent optical properties.

Comparative Example 1

Comparative Example 1 was performed as in Example 1 except that the antistatic coating layer was not formed. The results are shown in Table 1.

Comparative Example 2

The antistatic coating liquid prepared in Preparation Example 4 was coated onto one surface of the polyamide-imide film produced in Production Example 1 using #7 Meyer Bar, and the antistatic coating liquid was dried at 60° C. for 5 minutes and irradiated with UV at 1 J/cm$^2$ using a high-pressure metal lamp, thereby forming an antistatic layer having a thickness of 1 μm.

As shown in Table 1, as a result of measuring the physical properties in the same manner as that of Example 1, in a case where the water contact angle was not satisfied, although the value of the surface resistance was within the range of $10^9$ to $10^{11}$ Ω/□, the peeling defect occurred and the peeling force of the antistatic layer was hardly increased. Therefore, it was appreciated that peeling between the antistatic layer and the OCA layer or the OCR layer when the protective film was peeled off was remarkable.

TABLE 1

|  | Surface resistance (Ω/□) | Water contact angle | Peeling force of antistatic layer (kgf/inch) | Peelability of protective film | Light transmittance (%) (400 to 700 nm) | Modulus (GPa) | Haze (%) | YI |
|---|---|---|---|---|---|---|---|---|
| Example 1 | $1 \times 10^9$ | 60° | 1.7 | ◉ | 91 | 6.5 | 0.5 | 2.0 |
| Example 2 | $1 \times 10^9$ | 59° | 1.9 | ◉ | 89 | 6.6 | 0.4 | 2.1 |
| Example 3 | $1 \times 10^9$ | 64° | 1.8 | ◉ | 90 | 6.5 | 0.4 | 1.9 |
| Example 4 | $1 \times 10^{10}$ | 67° | 1.5 | ◉ | 89 | 6.4 | 0.7 | 1.9 |

TABLE 1-continued

| | Surface resistance (Ω/□) | Water contact angle | Peeling force of antistatic layer (kgf/inch) | Peelability of protective film | Light transmittance (%) (400 to 700 nm) | Modulus (GPa) | Haze (%) | YI |
|---|---|---|---|---|---|---|---|---|
| Example 5 | $1 \times 10^7$ | 58° | 1.4 | ⊚ | 90 | 6.7 | 0.6 | 1.8 |
| Comparative Example 1 | Over | 90° | 0.3 | X | 89.9 | 6.5 | 0.4 | 1.9 |
| Comparative Example 2 | $1 \times 10^{12}$ | 103° | 0.4 | Δ | 86 | 2.9 | 2.1 | 3.1 |

(Peelability of protective film: ⊚: all of 50 samples are neatly peeled off, Δ: peeling-off is observed in 1 to 5 samples, x: peeling-off is observed in 6 or more samples)

It can be appreciated from Table 1 that in a case where the antistatic coating layer having the surface resistance of $1 \times 10^6 \Omega/\square$ or more and the water contact angle of 70° or less was formed, the peelability of the protective film and the adhesive strength between the antistatic layer and the OCA film were significantly increased, such that the stability of the device when manufacturing a display panel was significantly improved.

In addition, by introducing the antistatic layer, when the protective film is peeled off, the protective coating layer may be prevented from being peeled off and the adhesive layer of the protective film may not remain on the protective layer or the base layer. It seems that such an effect results from the solution of the difficulty of peeling due to static electricity in accordance with the introduction of the antistatic layer.

In addition, in a case where the modified carbon nanotube is used as in Example 4, the surface resistance is further reduced, although not described separately in the present invention, a retention rate of an antistatic property after aging at 150° C. for 10 minutes is hardly changed, and the peeling force is further excellent, which is preferable.

In addition, it was confirmed that an excellent antistatic property was exhibited without reduction of the light transmittance of the base layer by using a specific resin in the antistatic layer.

As set forth above, according to the present invention, it is possible to provide a window cover film in which the adhesive component of the protective film is prevented from remaining on the window cover film and the window cover film is prevented from being peeled off by preventing an occurrence of static electricity when the protective film protecting the window cover film is peeled off.

Further, the present invention may provide a window cover film in which an element layer such as an OCA layer or an OCR layer disposed between layers of the window cover film or stacked on the window cover film is prevented from being peeled off when the protective film is peeled off from the window cover film.

Further, the present invention may improve optical properties such as the light transmittance and the yellow index.

Further, according to the present invention, productivity may be increased and reliability and stability of work may be improved when manufacturing a display panel.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A window cover film comprising:
a polyimide-based base layer; and
an antistatic layer formed on one surface of the base layer and having a surface resistance of $1 \times 10^6 \Omega/\square$ or more and a water contact angle of 80° or less.

2. The window cover film of claim 1, wherein the antistatic layer has a surface resistance of $1 \times 10^7$ to $1 \times 10^{13} \Omega/\square$ and a water contact angle of 20 to 70°.

3. The window cover film of claim 1, wherein the antistatic layer has a thickness of 1 nm to 1 μm.

4. The window cover film of claim 1, wherein the antistatic layer includes a siloxane-based resin which is a hydrolysis condensation reaction product of an alkoxysilane-based compound.

5. The window cover film of claim 4, wherein the antistatic layer further includes an organic acid or an organic acid salt.

6. The window cover film of claim 1, wherein a light transmittance measured at 388 nm is 3% or more, a total light transmittance measured at 400 to 700 nm is 86% or more, a haze is 1.5% or less, a yellow index is 4.0 or less, a b* value is 2.0 or less, a modulus measured according to ASTM D882 is 3 GPa or more, and an break elongation measured according to ASTM D882 is 5% or more.

7. The window cover film of claim 1, further comprising a hard coating layer formed on a surface opposite to the surface of the base layer on which the antistatic layer is formed.

8. The window cover film of claim 7, wherein the hard coating layer has a water contact angle of 100° or more and a pencil hardness of 2 H or higher.

9. The window cover film of claim 7, wherein a light transmittance measured at 388 nm is 3% or more, a total light transmittance measured at 400 to 700 nm is 86% or more, a haze is 1.5% or less, a yellow index is 4.0 or less, and a value is 2.0 or less.

10. The window cover film of claim 7, wherein the hard coating layer includes an alicyclic epoxidized silsesquioxane-based compound.

11. The window cover film of claim 1, wherein the base layer has a modulus measured according to ASTM D882 of 3 GPa or more, a break elongation measured according to ASTM D882 of 8% or more, a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a value of 2.0 or less.

12. The window cover film of claim 1, wherein the base layer includes a unit derived from fluorine-based aromatic diamine, a unit derived from aromatic dianhydride, a unit derived from alicyclic dianhydride, and a unit derived from aromatic diacid dichloride.

13. The window cover film of claim 1, further comprising a protective film formed on the other surface of the base layer on which the antistatic layer is formed.

14. The window cover film of claim 1, further comprising an optically clear adhesive layer formed on the antistatic layer.

15. A flexible display panel comprising the window cover film of claim 14.

* * * * *